United States Patent
Koyama

[11] Patent Number: 6,028,714
[45] Date of Patent: Feb. 22, 2000

[54] ZOOM LENS

[75] Inventor: Takeshi Koyama, Yokohama, Japan

[73] Assignee: Canon Kabushiki Kaisha, Tokyo, Japan

[21] Appl. No.: 08/787,542

[22] Filed: Jan. 22, 1997

[30] Foreign Application Priority Data

Jan. 29, 1996 [JP] Japan ................................ 8-034318

[51] Int. Cl.$^7$ ........................ G02B 15/14; G02B 15/22
[52] U.S. Cl. ...................... 359/683; 359/685; 359/693; 359/695; 359/698; 359/684; 359/700
[58] Field of Search ................................ 359/683, 695, 359/698, 700, 686, 685, 693, 684; 396/81

[56] References Cited

U.S. PATENT DOCUMENTS

| | | | |
|---|---|---|---|
| 3,884,555 | 5/1975 | Suwa et al. | 359/693 |
| 4,113,355 | 9/1978 | Tsuji et al. | 359/693 |
| 4,178,076 | 12/1979 | Tsuji et al. | 359/693 |
| 4,576,444 | 3/1986 | Kawamura | 359/685 |
| 4,787,719 | 11/1988 | Imai | 359/693 |
| 4,830,477 | 5/1989 | Takashi et al. | 359/685 |
| 5,144,492 | 9/1992 | Iijima et al. | 359/693 |
| 5,159,494 | 10/1992 | Yamanashi | 359/693 |
| 5,467,226 | 11/1995 | Watanabe | 359/693 |
| 5,568,321 | 10/1996 | Ogawa et al. | 359/676 |
| 5,786,941 | 7/1998 | Kuwana et al. | 359/683 |

*Primary Examiner*—Georgia Epps
*Assistant Examiner*—Evelyn A. Lester
*Attorney, Agent, or Firm*—Fitzpatrick, Cella, Harper & Scinto

[57] ABSTRACT

A zoom lens comprises a plurality of lens units movable along an optical axis for zooming and a lens unit movable along the optical axis for focusing, wherein the focusing lens unit moves integrally with one lens unit of the plurality of lens units in at least one zooming zone, and, in another zooming zone, moves while varying a separation thereof relative to the one lens unit.

2 Claims, 3 Drawing Sheets

ZOOM LENS

BACKGROUND OF THE INVENTION

1. Field of the Invention

This invention relates to zoom lenses and, more particularly, to zoom lenses of the so-called "inner" or "rear" focus type suited to be used in photographic cameras, video cameras or broadcasting cameras. Still more particularly, this invention relates to the structure of a cam for moving either a lens unit behind the zooming section or one of the lens units of the zooming section to effect focusing, while keeping the image always at a good quality.

2. Description of Related Art

For the zoom lenses to be used in cameras or the like, there have been many previous proposals on the type that moves the lens unit for focusing forward by varying amounts with variation of the zooming position, or the so-called "inner" focus type (or "rear" focus type).

In general, the use of the inner focus type produces outstanding advantages over that type of zoom lens which uses the first lens unit in focusing. Of these, the first lens unit becomes smaller in the effective diameter. This facilitates improvements of the compact form of the entirety of the lens system. Also, close-up photography, particularly, supershort focusing, becomes easier to perform. Further, because the lens unit to be used is relatively small in size and light in weight, a weaker driving force suffices for moving that lens unit. This leads to the possibility of making rapid focus adjustment.

With the zoom lens of the inner focus type, during zooming (or varying the focal length) from the wide-angle end to the telephoto end, the focusing movement has to be varied despite an object remaining at the same distance. For this reason, a special cam mechanism is used to make the control.

Taking an example of the zoom lens comprising, in order from an object side, a first lens unit of positive refractive power, a second lens unit of negative refractive power, a third lens unit of positive refractive power and a fourth lens unit of positive refractive power, the first, second and fourth lens units are moved to effect zooming and the third lens unit is moved to effect focusing. In this inner focus type zoom lens, despite the object remaining at the same distance, the third lens unit for focusing has to change its axial position as the focal length setting changes. Because of this, the operating mechanism for such a zoom lens detects the axial position of the lens unit for varying the focal length and specifies the current zooming position. By this, the focusing lens unit is moved to an adjusted position.

In many prior known zoom lenses, the focusing lens unit is brought to operative connection with another movable lens unit or units, thus reducing the number of cams.

FIG. 3 is a longitudinal section view of a mechanical mounting for such a zoom lens. FIG. 4 is a schematic diagram of the loci of motion with zooming of all the lens units of FIG. 3.

In FIG. 3, the first lens unit 1, the second lens unit 2 and the fourth lens unit 4 have cam followers or pins 11, 12 and 14, respectively. The third lens unit 3 is used for focusing. A helicoid bar 13 extends axially from the holder of the second lens unit 2. A cam ring 15 has cam grooves. A fixed tube 16 has an axially elongated guide slot. When the cam ring 15 is rotated with respect to the fixed tube 16, the first lens unit 1, the second lens unit 2 and the fourth lens unit 4 are moved forward in differential relation as determined by their cams, thus varying the focal length. During this time, the cam pins 11, 12 and 14 are restrained from moving around an optical axis L. Therefore, the first lens unit 1, the second lens unit 2 and the fourth lens unit 4 do not rotate when moving axially forward.

Meanwhile, the third lens unit 3 is moved along the optical axis L by the helicoid bar 13 extending from the second lens unit 2, so that the relative position of the third lens unit 3 to the second lens unit 2 is varied. Although the third lens unit 3 is linked to the second lens unit 2, the zooming movements of the two lens units 2 and 3 are, therefore, caused to differ from each other. That is, the second and third lens units move also in differential relation. Further, the third lens unit 3, even during focusing, moves along the optical axis L although the second lens unit 2 remains stationary. That is, the third lens unit 3 moves not only during zooming, but also during focusing, playing roles like the so-called compensator which also serves as the focusing lens. Such a third lens unit 3 is made movable under the control of what is called an "electronic cam".

In general, the use of the inner focusing method in the zoom lens leads, as described before, to obtain the advantages of improving the compact form of the entire lens system, making it possible to do rapid focusing, and decreasing the minimum object distance.

However, on the other hand, the axial position of the lens unit for varying the focal length must be detected with very high accuracy in determining the zooming position. Otherwise, the lens unit for focusing could not be put at a right axial position, and a focusing error would result. FIG. 4 is a diagram for explaining the paraxial power arrangement of the zoom lens of FIG. 3. The arrows show the directions of movement of the lens units during zooming from the wide-angle end W to the telephoto end T. Incidentally, the illustrated zoom loci are the ones which occur when the zoom lens is focused on an object at infinity.

Referring to FIG. 4, assume that the zooming position of the zoom lens is actually in the telephoto end T. Further, suppose, at this time, a detecting means for detecting the zooming position has made such error that the zooming position of the zoom lens is determined to be in a zooming position X. In this case, the separation between the second lens unit 2 and the third lens unit 3 should, as a rule, take a distance DT for the telephoto end T. Nonetheless, a distance DX for the zooming position X is adopted in controlling the separation between the second lens unit 2 and the third lens unit 3. Under this condition, therefore, the position of the third lens unit 3 is adjusted not to a point "b" but to a point "a". Hence, a near focus state results as the third lens unit 3 has been moved from the point "b" toward the object side in excess by a distance (DT–DX).

Again, conversely assume that although the actual zooming position is in the zooming position X in FIG. 4, the detecting means for the zooming position has determined that the zooming position is in the telephoto end T. In this case, the separation between the second lens unit 2 and the third lens unit 3 should be the distance DX. Nonetheless, it happens that the third lens unit 3 is moved over the point "a" down to the point "b". This means that the third lens unit 3 moves too longer rearward by the distance (DT–DX). Hence, a far focus state results as is opposite to the former.

In recent years, zoom lenses of ever improved compact form are to be developed. To this purpose, the refractive power of each lens unit becomes stronger. So, the lens sensitivity tends to rise. Particularly for the focusing lens unit, the tolerance to specify the sharp focus is severe. In this case, the reading error of the zooming position, however slight it may be, will result in so much a large deviation from the sharp focus as is not negligible.

BRIEF SUMMARY OF THE INVENTION

It is an object of the present invention to provide a zoom lens operating with selection of a plurality of discrete focal length settings as a lens unit for varying the focal length moves axially stepwise, in which even if a detecting means for detecting the axial zooming position of the lens unit for varying the focal length makes a detection error of the zooming position when a lens unit for focusing which is linked to the lens unit for varying the focal length is controlled by an electronic cam in accordance with the detected zooming position, a focus error is prevented from occurring, and in every one of the settings, no defocusing occurs, thereby obtaining an image of good quality.

To attain the above object, in accordance with one aspect of the present invention, there is provided a zoom lens which comprises a plurality of lens units movable along an optical axis for zooming and a lens unit movable along the optical axis for focusing, wherein the focusing lens unit moves integrally with one lens unit of the plurality of lens units in at least one zooming zone, and, in another zooming zone, moves while varying a separation thereof relative to the one lens unit.

DETAILED DESCRIPTION OF THE INVENTION

Figure 1:
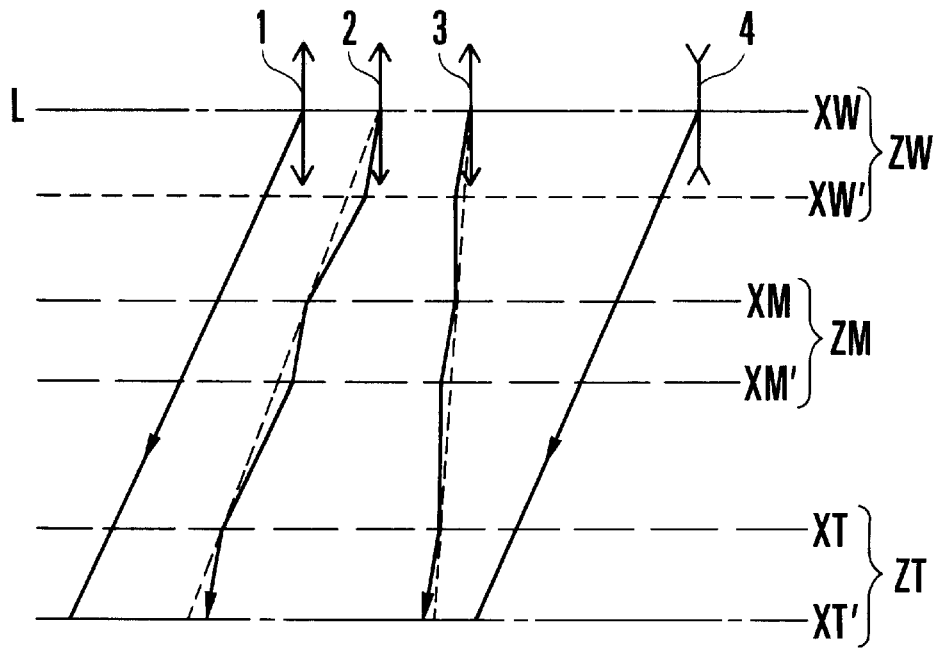
FIG. 1 is a diagram for explaining the paraxial refractive power arrangement of a first embodiment of the invention.

FIG. 1 is a diagram for explaining the paraxial refractive power arrangement of a first embodiment of the invention. In FIG. 1, there are illustrated a first lens unit 1 of positive refractive power, a second lens unit 2 of positive power, a third lens unit of positive refractive power movable along an optical axis to perform the focusing function, and a fourth lens unit 4 of negative refractive power. During zooming from a wide-angle end XW to a telephoto end XT', the first lens unit 1 and the fourth lens unit 4 are moved toward the object side linearly as shown by the arrows, and further, the second lens unit 2 is moved stepwise or polygonally and third lens unit 3, which is linked to the second lens unit 2, is also moved stepwise or polygonally in such a manner that the separation between the second lens unit 2 and the third lens unit 3 is varied at various zooming positions.

In this embodiment, the zoom lens is configured such that photography in an in-focus state to an acceptable degree (without variation of the image plane) is possible only in three discrete zooming position zones, i.e., a wide-angle end zone ZW between the zooming position XW and a zooming position XW', a middle zone ZM between a zooming position XM and a zooming position XM' and a telephoto end zone ZT between a zooming position XT and the zooming position XT', as shown in FIG. 1.

Although this embodiment has been described in connection with the three zooming position zones, it is to be understood that the invention is not confined to the number of zooming position zones. A variation may be made to employ other than three zooming position zones.

In this embodiment, during zooming, the second lens unit 2 and the third lens unit 3 move while being linked to each other. In zones other than the zooming position zones ZW, ZM and ZT, the second lens unit 2 and the third lens unit 3 move while varying the separation therebetween. Within each of the zooming position zones ZW, ZM and ZT, as described above, the second lens unit 2 and the third lens unit 3 integrally move in parallel with each other in such a manner that an in-focus state is kept without variation of the image plane, so that the separation between the second lens unit 2 and the third lens unit 3 is kept constant.

Figure 3:
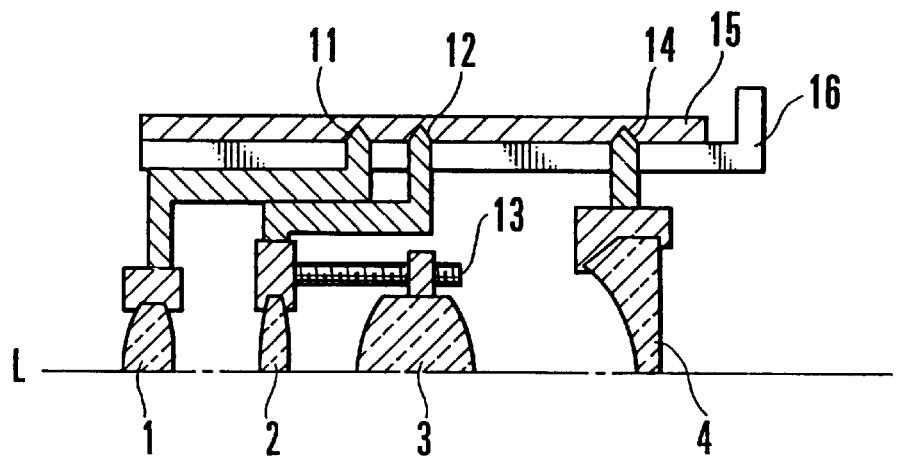
FIG. 3 is a sectional view of the main parts of a mechanical mounting for the zoom lens concerning the prior art and the present invention.
Figure 4:
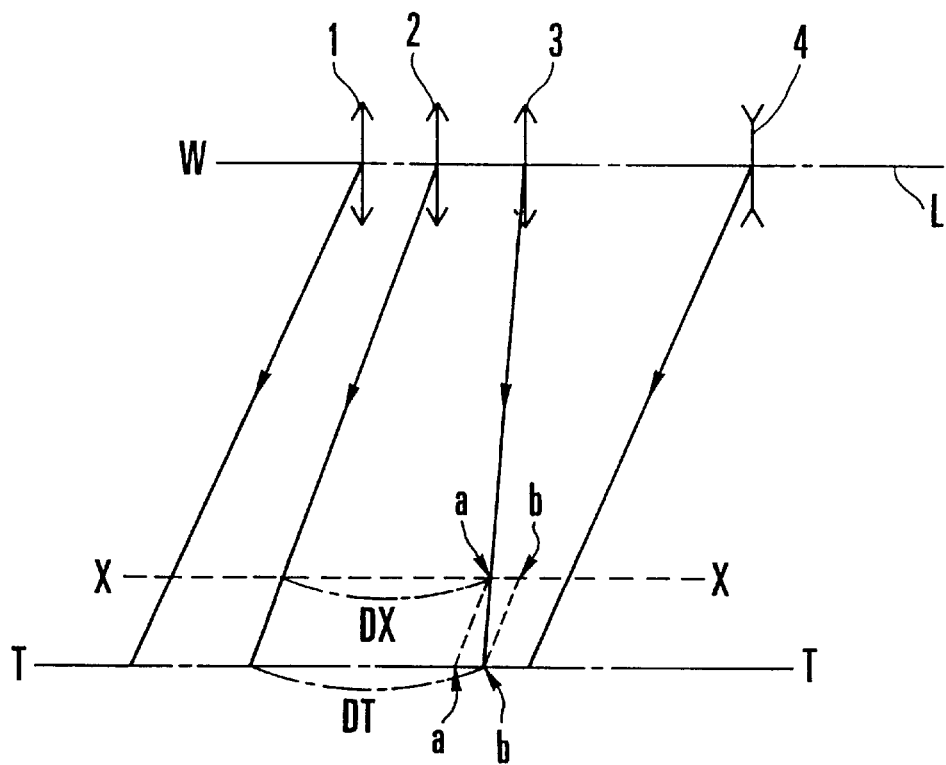
FIG. 4 is a diagram for explaining the paraxial refractive power arrangement of the conventional zoom lens.

The basic construction and arrangement of a lens barrel in this embodiment are almost similar to those shown in FIG. 3. Specifically, the first lens unit 1, the second lens unit 2 and the fourth lens unit 4, during zooming from the wide-angle end to the telephoto end, move according to the individual mechanical cams while varying the respective separations. The third lens unit 3 is linked to the second lens unit 2 by the helicoid bar provided on the holder of the second lens unit 2, and moves along the optical axis L during zooming, while varying its relative position to the second lens unit 2.

It should be pointed out that what is different from the prior art is that, while the cams for the first lens unit 1 and the fourth lens unit 4 are smooth in curvature, the cam for the second lens unit 2 is in a polygonal form of a mechanical cam. Therefore, the second lens unit 2 moves stepwise or polygonally as shown by the solid line segments. Another feature of this embodiment is that, as described above, the third lens unit 3 moves substantially integrally with the second lens unit 2 in each of the wide-angle end zone ZW (between the zooming positions XW–XW'), the middle zone ZM (between the zooming positions XM–XM') and the telephoto end zone ZT (between the zooming positions XT–XT'). In zones other than the zooming position zones ZW, ZM and ZT, a zooming control is made such that, as will be described later, the third lens unit 3 is driven by the helicoid bar so as to vary its separation relative to the second lens unit 2 by a predetermined amount stored beforehand as data on the basis of the output of a zooming position detecting means.

Further, to effect focusing, the third lens unit 3 is moved by the helicoid bar from the zoomed position to a position determined in reference to this position on the basis of distance information obtained from a distance measuring means (not shown) and zooming position information.

Incidentally, of the lines showing the motions of the second lens unit 2 and the third lens unit 3, the dashed ones suggest those in the conventional example of a zoom lens with an object at a certain distance (infinitely distant object). In the conventional example, as described above, the third lens unit 3 plays a role of the compensator. In this embodiment of the invention, on the other hand, it is in each of the zooming position zones ZW, ZM and ZT that the second lens unit 2 and the third lens unit 3 move integrally with each other so as to keep the constant position of the image plane (not shown).

In other words, in each of the zooming position zones ZW, ZM and ZT, the second lens unit 2 and the third lens unit 3 are integrated to play the role of the compensator. Therefore, in each of the zooming position zones ZW, ZM and ZT, i.e., the zones between the zooming positions XW–XW', between the zooming positions XM–XM' and between the zooming positions XT–XT' as shown in FIG. 1, no matter where the second lens unit 2 is located, the separation between the second lens unit 2 and the third lens unit 3 is made constant, so that an in-focus state is attained.

For example, even if, although the actual zooming position is the telephoto end XT', the detecting means for the zooming position determines it as the position XT due to the detection error, the image plane takes the constant position, thereby not hindering an in-focus state, because the separation between the second lens unit 2 and the third lens unit 3 is almost constant within the zooming position zone ZT, i.e., between the zooming position XT' and the zooming position ZT.

Therefore, even if the accuracy of detection of such a detecting means is lowered or even if the sensitivity of the third lens unit 3, which moves according to the electronic cam, in respect of the relative position to the other lens unit is relatively high, it is possible to assure establishment of a sharp focus with high accuracy.

Figure 5:
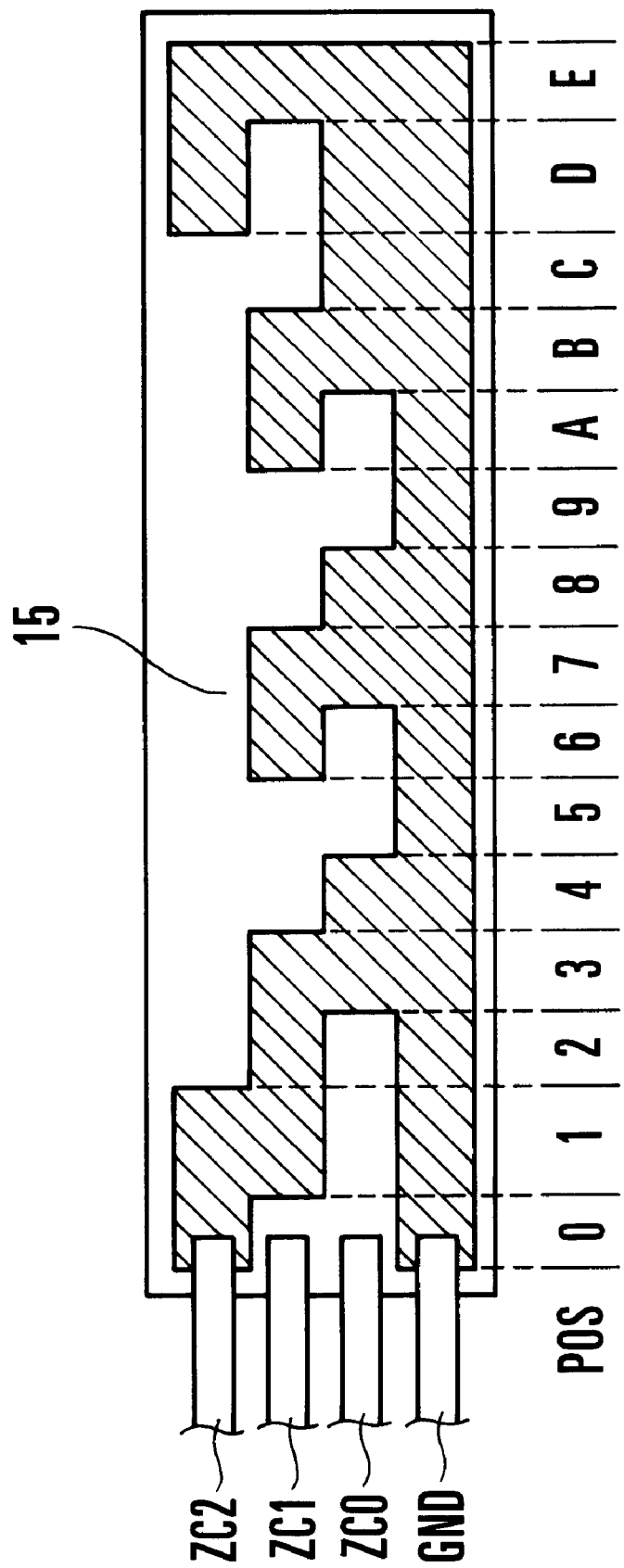
FIG. 5 is a plan view of a code plate for detecting the zooming zones.

FIG. 5 shows a form of the structure for detecting the zooming positions. A code plate as shown in FIG. 5 is provided on the rotatable cam ring 15 shown in FIG. 3, and is associated with a ground brush GND and three control brushes ZC0, ZC1 and ZC2 which are provided on the fixed tube 16. This structure detects the turned position of the cam ring 15, that is, the zooming position.

Incidentally, in a case where the sensitivity of the second lens unit 2 in respect of the relative position is low enough, there is no need to move the third lens unit 3 stepwise, and only the second lens unit is moved stepwise. Even by this, the above-described results can be attained.

These features of this embodiment are applicable to the other forms of zoom lenses of the inner focus type with the production of similar advantages, of course.

Figure 2:
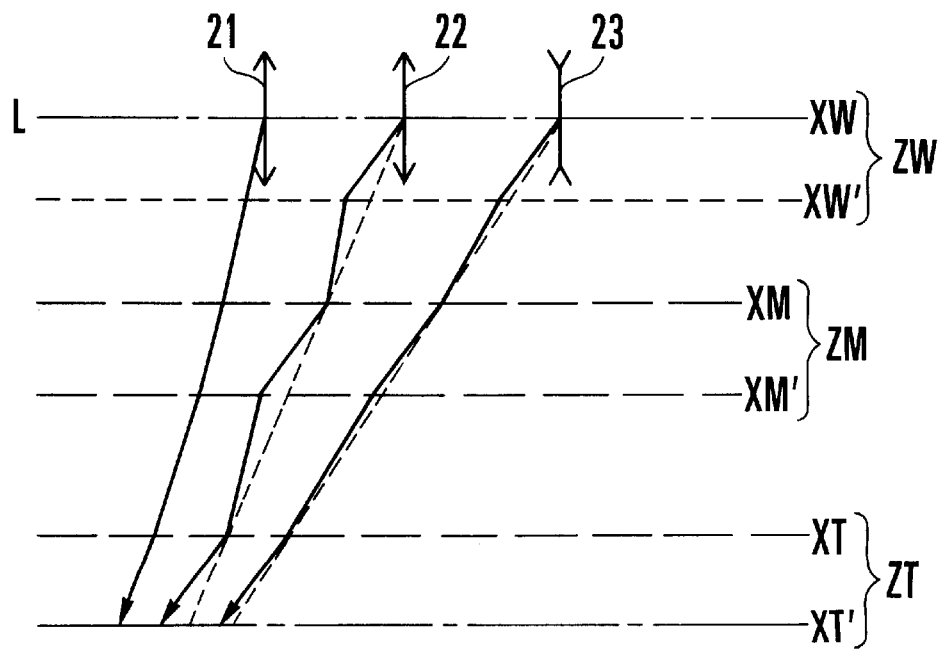
FIG. 2 is a diagram for explaining the paraxial refractive power arrangement of a second embodiment of the invention.

FIG. 2 is a diagram for explaining the paraxial refractive power arrangement of a second embodiment of the invention. In FIG. 2, there are illustrated a first lens unit 21 of negative refractive power, a second lens unit 22 of positive refractive power, and a third lens unit 23 of negative refractive power movable along an optical axis to perform the focusing function. The arrows show the loci of motion during zooming from the wide-angle end XW to the telephoto end XT'. The zoom lens is moved toward the image side when focusing from an infinitely distant object to an object at the minimum distance. The third lens unit 23 is linked to the second lens unit 22 by a helicoid bar. The first lens unit 21 and the second lens unit 22 are moved by the respective cams during zooming. The other reference characters denote the same as those of FIG. 1. In the similar way, the second lens unit 22 and the third lens unit 23 move substantially integrally with each other within each of the zooming position zone ZW between the zooming positions XW–XW', the zooming position zone ZM between the zooming positions XM–XM' and the zooming position zone ZT between the zooming positions XT–XT'.

The axial position of the second lens unit 22 is detected to determine the zooming position, which is reflected to control the axial position of the third lens unit 23. At this time, even if the detecting means for the zooming position makes an erroneous detection within the zooming position zone ZW, ZM or ZT, the relative position between the second lens unit 22 and the third lens unit 23 remains constant.

In this embodiment, the two lens units 22 and 23 are provided with the zooming position zones ZW, ZM and ZT to thereby effectively prevent the image from becoming out of focus despite the detecting means for the zooming position having made an erroneous detection. The image of good quality is thus obtained in every focal length setting.

According to the invention, as described above, in a zoom lens operating with selection of a plurality of discrete focal length settings as a lens unit for varying the focal length moves axially stepwise, even if a detecting means for detecting the axial zooming position of the lens unit for varying the focal length makes a detection error of the zooming position when a lens unit for focusing which is linked to the lens unit for varying the focal length is controlled by an electronic cam in accordance with the detected zooming position, a focus error is prevented from occurring, and in every one of the settings, no defocusing occurs, thereby obtaining an image of good quality.

I claim:

1. A zoom lens having a plurality of discrete zooming portions, said zoom lens comprising:
    a plurality of lens units which move along an optical axis while changing spaces during shifting from a predetermined discrete zooming portion to a different discrete zooming portion, each of said plurality of lens units moving with a constant space in each of the plurality of discrete zooming portions.

2. A zoom lens according to claim 1, further comprising detecting means for detecting a discrete zooming portion of said zoom lens, wherein said plurality of lens units move on the basis of detection information of said detecting means.

* * * * *